United States Patent
Clarke et al.

(10) Patent No.: US 8,776,676 B2
(45) Date of Patent: Jul. 15, 2014

(54) FRUIT SEED JUICER OR VEGETABLE SEED JUICER

(76) Inventors: Roy Clarke, Tobago (TT); Carlos Andrew Thomas, Brooklyn, NY (US)

( * ) Notice: Subject to any disclaimer, the term of this patent is extended or adjusted under 35 U.S.C. 154(b) by 478 days.

(21) Appl. No.: 13/052,945

(22) Filed: Mar. 21, 2011

(65) Prior Publication Data

US 2012/0240792 A1 Sep. 27, 2012

(51) Int. Cl.
*A23N 1/00* (2006.01)

(52) U.S. Cl.
USPC .............................. 99/509; 99/510; 99/512

(58) Field of Classification Search
CPC ............. B23P 17/04; A47J 19/00; A23N 1/02
USPC ................... 99/495, 501, 506, 509, 510, 512
See application file for complete search history.

(56) References Cited

U.S. PATENT DOCUMENTS

| | | | |
|---|---|---|---|
| 3,809,325 A | 5/1974 | Marrie | |
| 3,969,878 A | 7/1976 | Morganeier | |
| 5,520,105 A | 5/1996 | Healy | |
| 5,924,357 A | 7/1999 | Chen | |
| 6,161,475 A | 12/2000 | Coppelletti | |
| 6,237,475 B1 | 5/2001 | Ascari et al. | |
| 7,059,241 B2 | 6/2006 | Lin | |
| 7,628,108 B2 | 12/2009 | Neto | |
| 2005/0028690 A1 * | 2/2005 | Neto | 100/213 |

FOREIGN PATENT DOCUMENTS

JP 2001346700 A * 12/2001 ............ A47J 43/046

* cited by examiner

*Primary Examiner* — Jianying Atkinsson

(57) ABSTRACT

In one embodiment of the invention, an apparatus for a juicer includes: a cutting chamber; a squeezing chamber adjacent to the cutting chamber; wherein the cutting chamber includes a cutter; and wherein the squeezing chamber includes a press. In another embodiment of the invention, a method of assembling a juicer includes: providing a cutting chamber; placing at least one cutter in the cutting chamber; providing a squeezing chamber in a position adjacent to the cutting chamber; and providing a press in the squeezing chamber.

17 Claims, 12 Drawing Sheets

FRUIT SEED JUICER OR VEGETABLE SEED JUICER

TECHNICAL FIELD

Embodiments of the invention relate generally to a fruit seed juicer or vegetable seed juicer.

BACKGROUND

A healthy or relaxing lifestyle is desired by many individuals. To achieve a healthy and relaxing lifestyle, nutritious food is necessary. Nutritious food can include, for example, fruit juices or vegetable juices. Additionally, vendors, employers, service providers (e.g., restaurants, hotels, and resorts), stadiums/arenas, and many other businesses also have many customers who demand refreshments which can include fruit or vegetable juices.

While the process of juicing the fruits or vegetables may seem straight-forward from a high viewpoint, this high viewpoint is not accurate from a closer viewpoint because this juicing process is actually expensive for the juice provider. There are reasons why the juice provider will incur expenses in the juicing process. For example, the skins and seeds of particular fruits (or vegetables) are typically needed to be removed prior to juicing. This requirement of removing the skins and seeds often requires some form of manual labor which adds to the costs of the juice provider. Additionally, manual labor costs will often increase for juicing higher numbers of fruits or vegetables because the workers will have to work longer hours or/and the workers will receive more per-piece compensation for juicing the higher number of fruits and/or vegetables. Additionally, if the supplies of fruits or vegetables are plentiful for juicing, then there would be a need to quickly juice these supplies before they spoil or become rotten, or so that the juices are quickly commercially available in the marketplace.

Therefore, there is a continuing need to quickly and efficiently juice the fruits (or vegetables) without first having to remove the fruit skin (or vegetable skin), so that the costs and complexities in juicing are reduced. Based on the above discussion, the current technology is limited in its capabilities and suffers from at least the above constraints and deficiencies.

SUMMARY

In one embodiment of the invention, an apparatus for a juicer includes: a cutting chamber; a squeezing chamber adjacent to the cutting chamber; wherein the cutting chamber includes a cutter; and wherein the squeezing chamber includes a press.

In another embodiment of the invention, an apparatus for a juicer, includes: means for holding an object to be cut; means for receiving sliced portions of the object; wherein said means for holding the object includes means for cutting the object; and wherein said means for receiving includes means for crushing said sliced portions.

In another embodiment of the invention, a method of assembling a juicer includes: providing a cutting chamber; placing at least one cutter in the cutting chamber; providing a squeezing chamber in a position adjacent to the cutting chamber; and providing a press in the squeezing chamber.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION OF PREFERRED EMBODIMENTS

Figure 1:
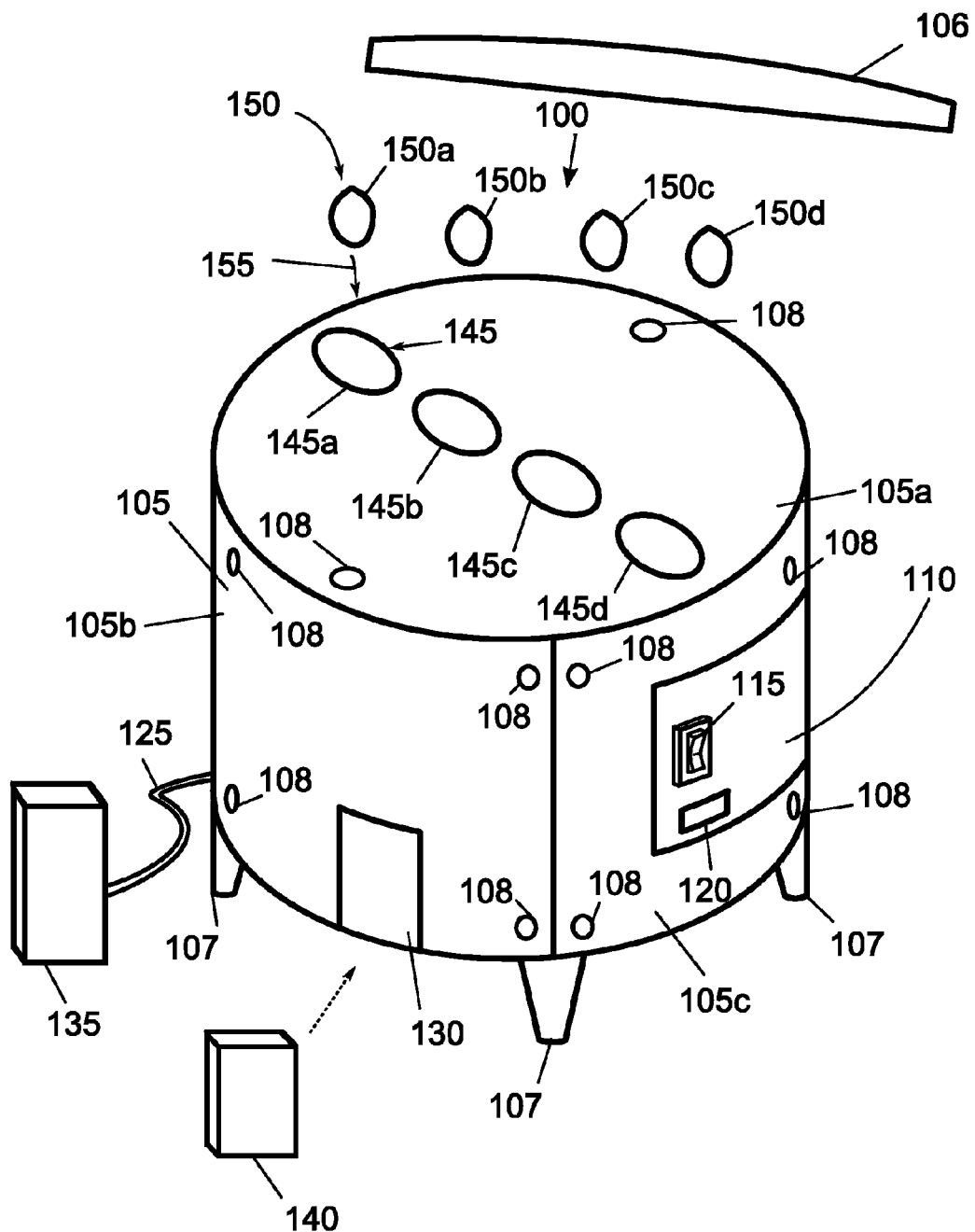
FIG. 1 is a perspective view of an example juicer package which contains a juicer in accordance with an embodiment of the invention.

In the description herein, numerous specific details are provided, such as examples of components, parts, structures, and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, structures, and/or the like. In other instances, well-known structures, materials, or operations are not shown or described in detail to avoid obscuring aspects of embodiments of the invention. Additionally, the figures are representative in nature and their shapes are not intended to illustrate the precise shape or precise size of any element and are not intended to limit the scope of the invention.

Those skilled in the art will understand that when an element or part in the drawings is referred to as being "on" (or "connected" to or "coupled" to or "attached" to) another element, it can be directly on (or attached to) the other element or intervening elements may also be present. Furthermore, relative terms such as "inner", "outer", "upper", "above", "lower", "beneath", and "below", and similar terms, may be used herein to describe a relationship of one element or another element. It is understood that these terms are intended to encompass different orientations of the device in addition to the orientation depicted in the figures.

Although the terms first, second, and the like may be used herein to describe various elements, components, parts, regions, layers and/or sections, these elements, components, parts, regions, layers, chambers, and/or sections should not be limited by these terms. These terms are only used to distinguish one element, component, part, region, layer, chamber, or section from another element, component, part, region, layer, chamber, or section. Thus, a first element, component, part, region, layer, chamber, or section discussed below could be termed a second element, component, part region, layer, chamber, or section without departing from the teachings of the present invention.

Embodiments of the invention are described herein with reference to cross-sectional view illustrations that are schematic illustrations of representative embodiments of the invention. As such, variations from the shapes of the illustrations as a result of, for example, manufacturing techniques and/or tolerances are expected. Embodiments of the invention should not be construed as limited to the particular shapes of the regions or components/parts/elements illustrated herein but are to include deviations in shapes that result, for example, from manufacturing or particular implementations. For example, an element illustrated or described as square or rectangular may typically have rounded or curved features due to normal manufacturing tolerances or due to a particular implementation. Thus, the elements illustrated in the figures are schematic in nature and their shapes are not intended to illustrate the precise shape of an element of a device and are not intended to limit the scope of the invention.

FIG. 1 is a perspective view of an example juicer package 100 which contains a juicer in accordance with an embodiment of the invention. The details of embodiments of the juicer are subsequently discussed below. The juicer package 100 includes a juicer housing 105 which can be constructed from, for example and without limitations, durable plastic, other durable synthetic material, stainless steel or other suitable metal or metal alloys, a suitable combination of the above materials, or other suitable materials. Those skilled in the art are also aware of other various materials that are suitable for a juice housing. Additionally, juice housings are provided in various juicing products that are commercially available from various vendors.

The housing 105 can be manufactured by, for example and without limitations, molding, part assembly of separate components/pieces, or other manufacturing methods that are known to those skilled in the art.

In the example of FIG. 1, the juice housing 105 is shown as circular or oval in shape. However, the juice housing 105 can have other suitable shapes such as, for example and without limitations, a square shape or rectangular shape.

In one embodiment of the invention, the juice housing 105 can be taken apart easily or conveniently after manufacture, for purposes of, for example, cleaning the juicer or repairing the juicer. For example, the juice housing 105 is formed by the example juice housing walls 105a, 105b, and 105c. Other walls may be part of the juice housing 105, but are not shown in the drawings for purposes of avoiding in overcrowding the drawings. Each of the walls 105a, 105b, and 105c are removably attached together, so that the walls can be attached together to form a closed housing configuration and can be disassembled or taken apart from each other. In the disassembled form, the walls 105a, 105b, and 105c are separated from each other. Two components that are removably attached (or removably coupled or removably secured or removably inserted) means that the two different components can be attached together and detached apart.

As one example, the walls 105a, 105b, and 105c can snap together and snap apart in a manner that would be known to those skilled in the art for manually snapping together and manually snapping apart at least two components. As another example, attachment mechanisms 108 can be used to removably attach the walls 105a-105c together. The attachment mechanisms 108 may be, for example, screws or other suitable attachment mechanisms. Those skilled in the art will realize that based on the discussion herein, other suitable standard methods or other suitable standard mechanisms can be used to removably attach together and disassemble the walls 105a-105c.

A cover 106 can be configured to be placed on top of the housing 105. The cover can be, for example and without limitations, glass, plastic, other durable synthetic material, stainless steel, or other suitable materials.

A plurality of housing legs 107 may be attached (or removably attached) to the lower portion of the juice housing 105. However, in other embodiments of the invention, the housing legs 107 are omitted so that the juice housing 105 is flat at the lower portion of the juice housing 105.

The housing 105 may vary in size or volume. As an example and without limitations, the combination of the housing 105 and cover 106 can be 24 inches high by 24 inches wide. The housing 105 can be configured to other sizes and volumes.

In an embodiment of the invention, the juicer package 100 includes a user interface 110 that contains switches (or buttons, touchscreen selectors, or other actuators or control mechanisms) to permit the user to turn on/off (or otherwise provide settings to) a juicer in accordance with an embodiment of the invention. For example the user interface 110 includes an on/off actuator 115 (e.g., a switch) that can turn the juicer in an "ON" state or "OFF" state. Additionally or alternatively, in another embodiment of the invention, the user interface 110 can include a fruit/vegetable size selector 120 which permits the user to adjust the setting (or mode) of the juicer in accordance with the size of the fruit or vegetable, as will be further discussed below in additional details. The discussion of the juicing operation will be discussed further below.

The juicer package 100 may include a power chord 125 or portable power source housing 130 (or include both the power chord 125 and housing 130). The power chord 125 is removably coupled to a power supply 135 (which can be, for example, an AC power source) and may also, for example, be removably coupled to the juice housing 105. A portable power supply 140 (such as, for example, a battery or a rechargeable portable power pack) can be removably inserted into the portable power source housing 130. Either one of the power supply 135 or the portable power supply 140 can provide power to permit the juicer to performing juicing operations as will be discussed below in additional details.

In an embodiment of the invention, the juice housing 105 includes one or more openings 145 (or fruit entries 145, or apertures 145, or holes 145). In the example of FIG. 1, the juicer housing 105 includes the openings 145a, 145b, 145c, and 145d, although any number of openings can be included in the juicer housing 105. A fruit 150 (or vegetable 150) can be inserted 155 into a hole 145 so that the juicer can obtain juice from the fruit 150 or vegetable 150. In the discussion hereinafter, any reference to a fruit 150 (or fruits 150) may also mean a reference to a vegetable 150 (or vegetables 150). In the example of FIG. 1, the fruits 150a, 150b, 150c, and 150*d* are inserted into the openings 145*a*, 145*b*, 145*c*, and 145*d*, respectively, so that the juicer can juice the fruits.

Figure 2:
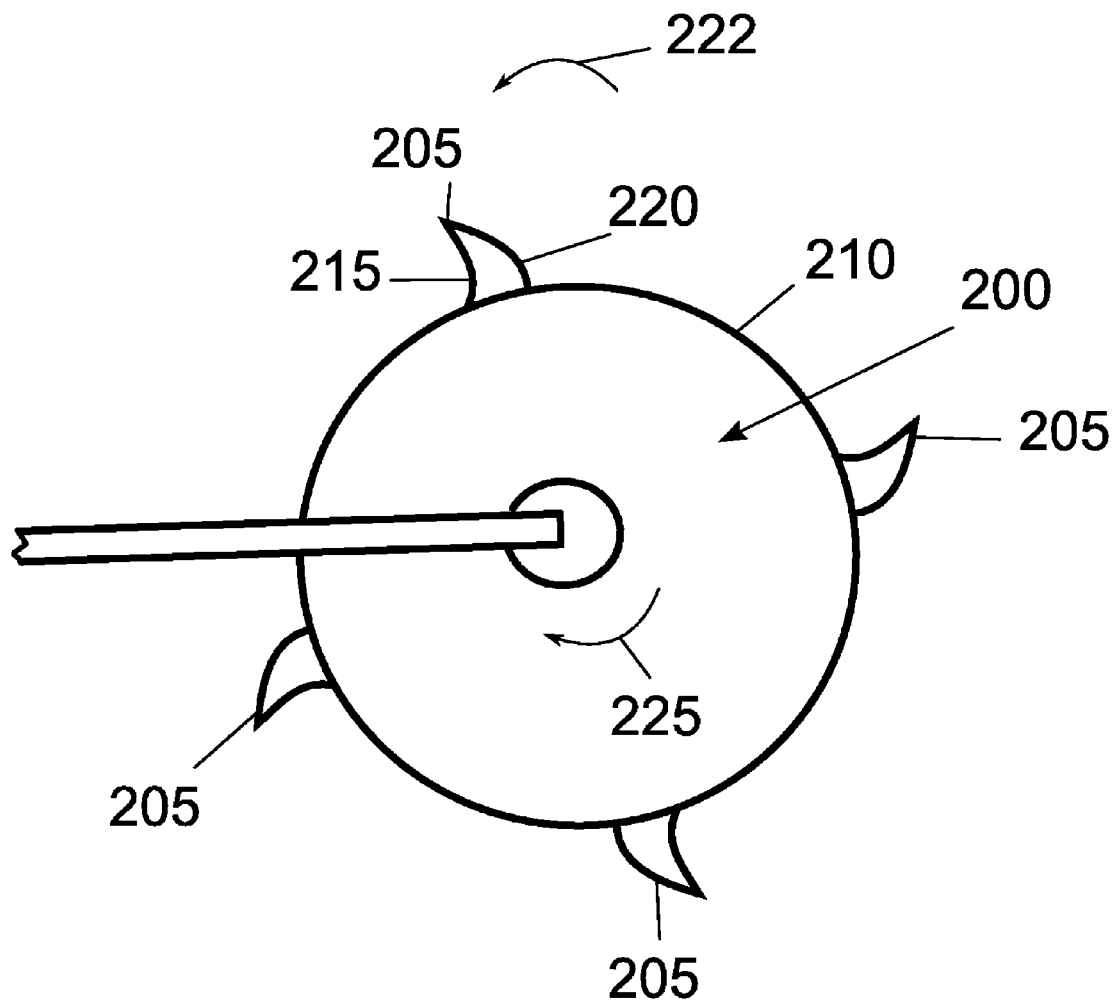
FIG. 2 is a side view of an example rotating cutter in accordance with an embodiment of the invention.

FIG. 2 is a side view of an example rotating cutter 200 in accordance with an embodiment of the invention. This rotating cutter 200 is used for slicing the fruits 150 during the juicing process for the fruits 150 (or vegetables 150). In an embodiment of the invention, the rotating cutter 200 includes a plurality of blades 205 that are staggered over the body edge 210 of the rotating cutter 200. The number of blades 205 in the cutter 200 may vary in number. In an embodiment of the invention, the blades 205 are designed to prevent clogging of the fruit parts that the blades 205 will cut away from the fruit 150. For example, a blade 205 includes an inner blade edge 215 and an outer blade edge 220 that both curve in the counter-clockwise direction 222 as shown in FIG. 2, in order to prevent the clogging of the fruit parts or fruit slices that have be sliced away or cut away from the fruit 150, as the rotating cutter 200 is rotating in the clockwise direction 225.

Figure 3:
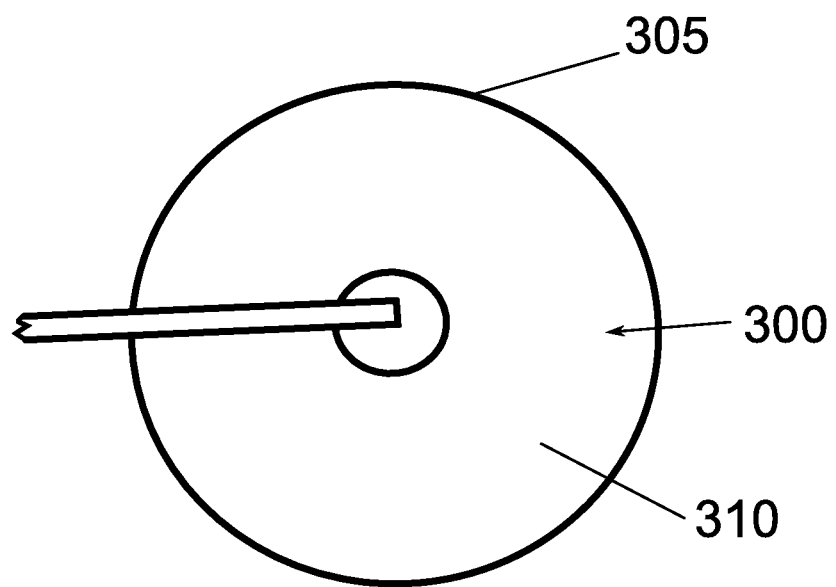
FIG. 3 is a side view of another example rotating cutter in accordance with an embodiment of the invention.

FIG. 3 is a side view of another example rotating cutter 300 in accordance with an embodiment of the invention. The rotating cutter 300 has a sharp edge blade 305 for cutting and slicing the parts of a fruit 150. This edge blade 305 is configured along the entire outer circumference of the body 310 of the rotating cutter 200. This edge blade 305 will prevent the clogging of the fruit parts or fruit slices that have been sliced away from the fruit 150.

In the discussion below, an embodiment of the invention provides a juicer with the rotating cutters 200 of FIG. 2 or the rotating cutters 300 of FIG. 3. In another embodiment of the invention, the juicer can include both a combination of the rotating cutters 200 of FIG. 2 and the rotating cutters 300 of FIG. 3. Those skilled in the art will realize that based on the discussion herein, other suitable blade configurations or blade types can be used for a rotating cutter of the juicer.

Figure 4:
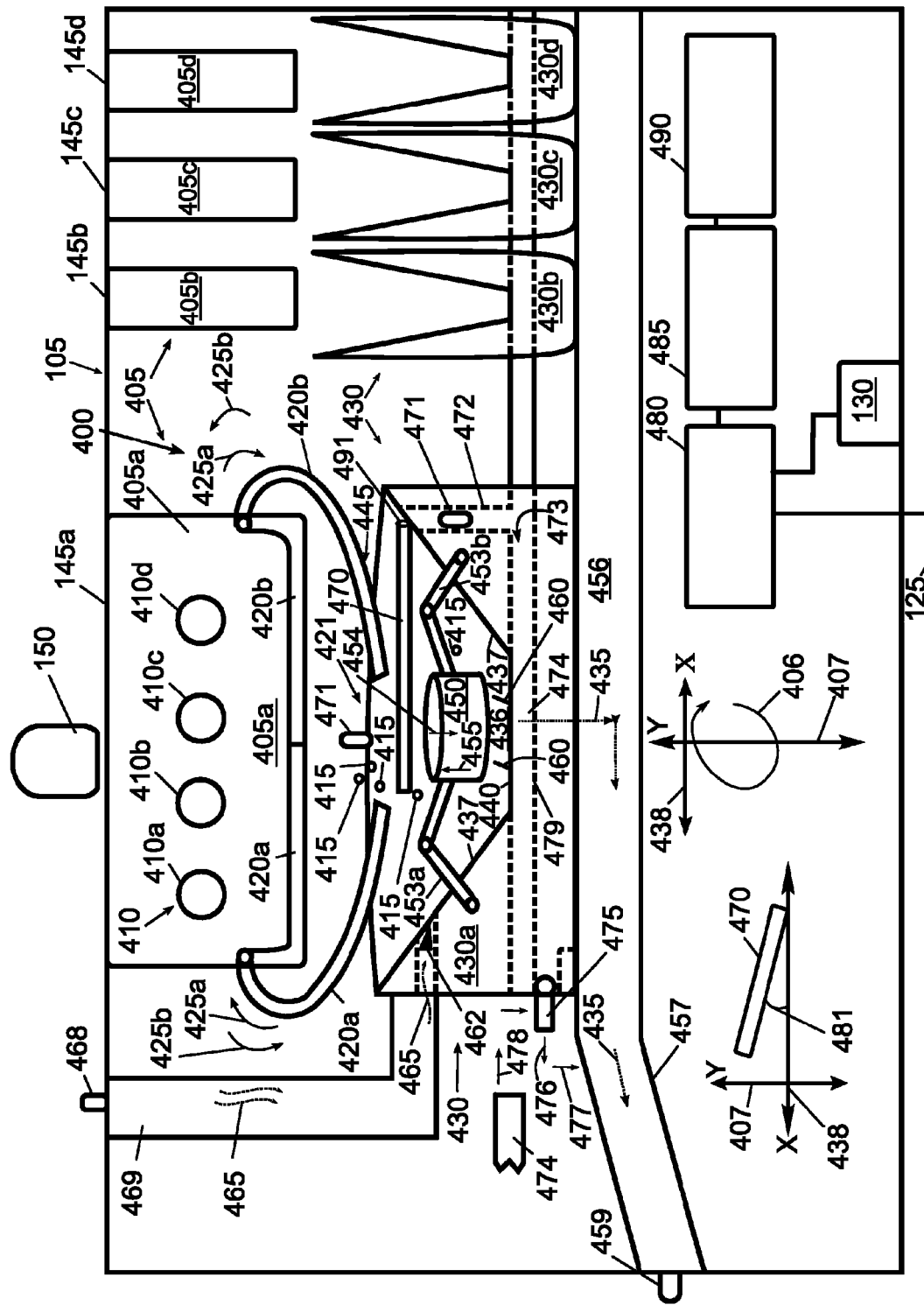
FIG. 4 is a cross-sectional side view of a juicer, in accordance with an embodiment of the invention, as contained within in the juicer package of FIG. 1.

FIG. 4 is a cross-sectional side view of a juicer 400 (or fruit seed juicer 400 or vegetable seed juicer 400), in accordance with an embodiment of the invention as contained within in the juicer housing 105 of FIG. 1. The view in FIG. 4 may be representative of, for example, the view along dashed double-headed arrows A-A as shown in FIG. 1. One or more fruits 150 are inserted into the fruit entries 145 (openings 145) on the juicer housing 105. In the example of FIG. 4, the fruit 150 is inserted in the opening 145*a*, and other fruits (not shown in FIG. 4) can be inserted as well into the other openings 145*b*-145*d*. As mentioned herein, the fruit 150 can be, alternatively, a vegetable or another sliceable object.

In an embodiment of the invention, the juicer 400 includes one or more cutting chambers 405 (or cleaning chambers 405) coupled to the fruit entries 145 and contained within the juicer housing 105. The fruits 150 or other sliceable objects 150 to be cut will be removably inserted and securely held within the cutting chambers 405. The cutting chambers 405 are configured to receive fruits with large seeds or small seeds. In the example of FIG. 4, the cutting chambers 405*a*, 405*b*, 405*c*, and 405*d*, are coupled to the fruit entries 145*a*, 145*b*, 145*c*, and 145*d*, respectively. In an embodiment of the invention, the cutting chambers 405*a* will rotate, for example, in the clockwise direction 406 with respect to a reference vertical axis (Y) 407 or rotate in a counter-clockwise direction that is opposite to the clockwise direction 406.

The number of cutting chambers 405 in the juicer 400 may vary. For purposes of avoiding in overcrowding the drawings, only the components in the cutting chamber 405*a* will be discussed herein, although the other cutting chambers 405*b*-405*d* will have similar components. For purposes of avoiding in overcrowding the drawings, the cutting chambers 405*b*, 405*c*, and 405*d* are also illustrated in a smaller size scale than the cutting chamber 405*a*.

Each cutting chamber 405 will have rotating cutters 410 for slicing or for cutting the skin and parts of the fruit 150. In FIG. 4, these rotating cutters 410 are represented by the circular elements 410 for simplicity in drawings. The functionality of the rotating cutters 410 are further discussed below. As also mentioned above, a cutting chamber 405 can include an embodiment of the rotating cutters 200 with the blade configuration of FIG. 2, or an embodiment of the rotating cutters 300 with the blade configuration of FIG. 3, or an embodiment that includes a combination of the cutters 200 and 300, or another embodiment that includes rotating cutters with a suitable blade configuration, or another embodiment that includes rotating cutters with a combination of cutters of different blade configurations. The number of cutters 410 in a cutting chamber 405 can also vary. In the example of FIG. 4, the cutting chamber 405*a* includes four (4) cutters 410, although any number of cutters 410 can be included in the cutting chamber 405*a*.

As the fruit 150 is held inside the cutting chamber 405*a*, the cutters 410 will slice the fruit 150 into sliced portions 415 (or parts 415). After the fruit 150 has been sliced into the portions 415, the cutter chamber bottom portions 420*a* and 420*b* will separate or disconnect from each other, and as a result, the portions 420*a* and 420*b* are configured to form an opening 421 at the bottom of the cutting chamber 405*a* that causes the sliced portions 415 to fall from the cutting chamber 405*a*. In particular, the bottom portion 420*a* will move in the clockwise direction 425*a* and the cutter bottom portion 420*b* will move in the counter-clockwise direction 425*b*, in order to form the opening 421 at the bottom of the cutting chamber 405*a*.

After the sliced portions 415 have fallen from the cutting chamber 405*a*, the bottom portion 420*a* will move in the counter-clockwise direction 425*b* and the bottom portion 420*b* will move in the clockwise direction 425*a* in order to close (remove) the opening 421 at the bottom of the cutting chamber 405*a* so that the portions 420*a* and 420*b* are again in contact with each other. Additional fruits 150 can be held inside the cutting chamber 405*a* for subsequent cutting. It is understood that the functionality related to the cutting chamber 405*a* will be applicable as well to the cutting chambers 405*b*, 405*c*, and 405*d*.

In an embodiment of the invention, the juicer 400 further includes one or more squeezing chambers 430 for receiving the sliced portions 415 and for squeezing the sliced portions 415 (of fruit 150) into juice 435 (liquid 435) as will be discussed below. The number of squeezing chambers 430 may vary in the juicer 400. In the example of FIG. 4, the squeezing chambers 430*a*, 430*b*, 430*c*, and 430*d*, are configured to (and positioned to) receive the falling sliced portions 415 from the cutting chambers 405*a*, 405*b*, 405*c*, and 405*d*, respectively. Therefore, the squeezing chambers 430 are adjacent to the cutting chambers 405. The number of squeezing chambers 430 in the juicer 400 may vary. For purposes of avoiding in overcrowding the drawings, only the components in the squeezing chamber 430*a* will be discussed herein, although the other squeezing chambers 430*b*, 430*c*, and 430*d* will have similar components.

In an embodiment of the invention, the squeezing chamber 430*a* will have an inner opening 436 (or inner cavity 436) that is, for example and without limitations, substantially cone-shaped or approximately cone-shaped. The inner wall 437 of chamber 430*a* are angled with respect to a reference horizontal axis (X) 438 and will, therefore, define and form the cone-shape configuration of the inner opening 436.

In another embodiment of the invention, the inner opening 436 is cylindrical in shape. In this embodiment, the inner wall 437 is approximately perpendicular to the reference horizontal axis 438.

The sliced portions 415 will fall from the cutting chamber 405a and into the inner opening 436 of the squeezing chamber 430a. The cone-shaped configuration of the inner opening 436 will cause the sliced portions 415 to fall and gather on top of a perforated base 440 of the squeezing chamber 430a. In one embodiment of the invention, this base 440 is also the top surface of a slidable waste tray 474, as will be discussed below. The perforated base 440 is on the bottom end (or one end) of the wall 437. Therefore, the squeezing chamber 430a will have the inner opening 436 with the perforated base 445 at a bottom end (or narrower end for a cone shaped wall 437) and with a hollow end 445 (for receiving the sliced portions 415) at the top end (or wider end for a cone shaped wall 437), where the top end is opposite to the bottom end, as illustrated in the example of FIG. 4.

In an embodiment of the invention, a press 450 (or press member 450) will squeeze the sliced portions 415 that have been collected in the base 440. The movable arms 453a/453b will move the press 450 in the downward direction 454 (substantially parallel to the vertical axis (Y) 407) in order for the press 450 to crush (or squeeze) the sliced portions 415 into the juice 435. The movable arms 453a/453b will then move the press 450 in an upward direction 455 (which is opposite to the downward direction 454). The press 450 can repeat its downward direction 454 in order to further crush (or squeeze) the sliced portions that have been collected at the base 440.

The movable arms 453a/453b can be, for example and without limitations, hydraulic arms. However, other suitable mechanisms may be used for the arms 453a/453b or for moving the press 450 in the directions 454 and 455. Although movable arms 453a/453b are shown in the example of FIG. 4 for moving the press 450 in the downward direction 454 and upward direction 455, those skilled in the art will realize based upon the teachings of embodiments of the invention herein that other suitable mechanisms may be used to control the movement of the press 450.

The diameter and length of the press 450 are configured in a manner that allows the sliced portions 415 to fall or drop from the cutting chamber 405a into the inner opening 436 and base 440. The press 450 can be constructed from rigid material such as, for example and without limitations, stainless steel, rigid metal or alloys, durable plastic, other durable synthetic materials, any suitable durable heavy duty material, or other suitable materials.

As a result of the press 450 crushing the sliced portions 415, the juice 435 will be formed on the perforated base 440. The perforations 500 (see FIG. 5) in the base 440 will cause the juice 435 to fall from the base 440 and into the juice chamber 456, where the gravitational force will cause the fall or flow of the juice 435, from the base 440 and into the juice chamber 456. In an embodiment of the invention, the juice chamber 456 has a slightly downward-angled portion 457 so that the gravitational force will cause the juice 435 to flow in a direction of the slightly downward-angle 457. The user of the juicer 400 can then obtain the collected juice 435 in the juice collection chamber 456 by accessing the opening 459. The opening 459 can be, for example and without limitations, a faucet-like mechanism, spout, or another suitable component that permits the user to obtain the collected juice 435 in the juice collection chamber 456.

In an embodiment of the invention, the juice collection chamber 456 is coupled to each of the squeezing chambers 430a-430d. In an embodiment of the invention, the juice collection chamber 456 is positioned along the circumference or boundary of the juicer housing 105 (FIG. 1). In another embodiment of the invention, the juice collection chamber 456 is located in only portion of the juicer housing 105 in order to achieve a reduction in size of the housing 105.

Optionally or additionally, in an embodiment of the invention, the squeezing chamber 430a will include the bottom cutters 460 for further slicing the sliced portions 415. In an embodiment of the invention, the cutters 460 are blades that movable (or can pivot with respect to the base 440) and flexible in characteristics and yet rigid, so that the press 450 will not damage or break the cutters 460 if the press 450 comes into contact with the cutters 460. Instead, the cutters 460 will move in the same direction as the press 450 so that the cutters 460 are not damaged by the press 450. In another embodiment of the invention, the press 450 will not come into contact with the cutters 460 so that the cutters 460 are not damaged. In another embodiment of the invention, the cutters 460 are omitted for purposes of decreasing the manufacturing and assembly costs of the juicer 400.

Optionally or additionally, in an embodiment of the invention, the squeezing chamber 430a will include a liquid spray 462 for spraying the liquid 465 into the inner opening 436. The liquid 465 can be, for example and without limitations, water or other suitable liquid forms as desired by the user of the juicer 400. The spray 462 will spray the liquid 465 into the inner opening 436, so that the liquid 465 will thin the juice 435 if the juice 435 too thick and is unable to exit the base 440 into the juice collection chamber 456. A liquid opening 468 permits the user of the juicer 400 to provide the liquid 465 into the liquid reservoir 469. For example and without limitations, the user can couple the liquid opening 468 to a tube and a faucet, or the user can pour the liquid 465 into the liquid opening 468 for collection into the liquid reservoir 469.

Additionally or optionally, in an embodiment of the invention, the squeezing chamber 430a includes a seed guard 470 (or seed filter 470) for preventing a seed 471 from falling into the inner opening 436 as the seed 471 is dropped from the cutting chamber 405a. Since the seed guard 470 prevents seeds 471 from falling into the inner opening 436, the seeds 471 will not jam or otherwise hinder the operation of the press 450. The seed guard 470 is angled with respect to (and non-parallel to) the reference horizontal axis (X) 438. As clearly shown in the bottom portion of FIG. 4 for purposes of avoiding in overcrowding the drawings, the seed guard 470 is inclined by an acute angle 481 from the horizontal axis (X) 438. Since the seed-guard 470 is angled with respect to the horizontal axis (X) 438, the seed 471 (and the skin that is peeled from the fruit 150) can slide substantially downward along the seed guard 470 and can automatically fall into the waste conduit 472 and into the waste chamber 473. As a result, the seed guard 470 and the gravitational force will guide the seeds 471 (and peeled fruit/vegetable skin) into the waste conduit 472 in the squeezing chamber 430a. The seeds 471 (and peeled skins) will fall down along and will be received by the waste conduit 472, and then will fall into the waste chamber 473 which may be, for example and without limitations, a chamber inside the slidable waste tray 474. The seeds 471 will then gather inside the slidable waste tray 474 at the bottom of (or adjacent to) the squeezing chamber 430a. In an embodiment of the invention, the slidable waste tray 474 is perforated at the top surface 440 (which is also the perforated base 440) and at a bottom tray surface 479 (which is opposite to the top surface 440 and where the waste chamber 473 is between the top surface 440 and the bottom tray surface 479), so that the juice 435 can flow from the inner opening 436 and through the tray 474 and into the juice chamber 456.

The seed guard 470 also permits the sliced portions 415 to fall into the inner opening 436 and also prevents the sliced portions 415 from falling on the press 450.

In an embodiment of the invention, the user of the juicer 400 can slide out the slidable tray 474 so that the user can remove the waste (crushed sliced portions 415) from the juice housing 105 (FIG. 1). At least some of the crushed sliced portions 415 will rest on the top 440 of the slidable tray 474. In an embodiment of the invention, the user can pull out a latch member 475 in the substantially horizontal direction 476 and substantially downward direction 477. As a result, the tray 474 will fall down in the substantially downward direction 477 and the user can then pull out the tray 474 in the horizontal direction 476, with the waste on the tray surface 440 and/or inside the tray chamber 473.

After the user is able to remove the waste from the tray 474, the user can then re-insert the tray 474 into the housing 105, in the substantially horizontal direction 478. The user can then re-engage the latch member 475, so that the tray 474 is again removably secured inside the juicer housing 105.

It is understood that the functionality related to the squeezing chamber 430a will be applicable as well to the squeezing chambers 430b, 430c, and 430d.

In an embodiment of the invention, the juicer 400 includes a circuit stage 480, motor 485, and shaft and gear assembly 490. These elements 480, 485, and 490 are positioned in the juicer 400 of FIG. 4 for illustration purposes only. More example details on the elements 480, 485, and 490 will be discussed below.

In one embodiment of the invention, at least some of the components shown in FIG. 4 (or other components of the juicer 400) can be taken apart (disassembled) easily or conveniently after manufacture, for purposes of, for example, cleaning the juicer 400 or repairing the juicer 400. For example, the chambers 405a-405d and/or 430a-430d can be disassembled from the juicer 400. As another example, other components can also be disassembled from the juicer 400. Those skilled in the art will realize that based on the discussion herein, various standard mechanisms (e.g., screws or other attachment mechanisms) can be used to removably attach together and disassemble at least some of the components of the juicer 400.

Those skilled in the art will realize, after reading the discussion herein, that other suitable materials or combination of suitable materials can be used for the components in the juicer 400 and juice housing 105. Those skilled in the art will also realize, after reading the discussion herein, that the assembly, manufacture, and/or construction of the components of the juicer 400 and juice housing 105 (FIG. 1) may be selectively varied based on cost, ease of manufacturing, or/and other considerations. Additionally, the parts or components in the juicer 400 can be suitably varied or substituted with other parts or components, as juicer components technologies improve in the future.

Figure 5:
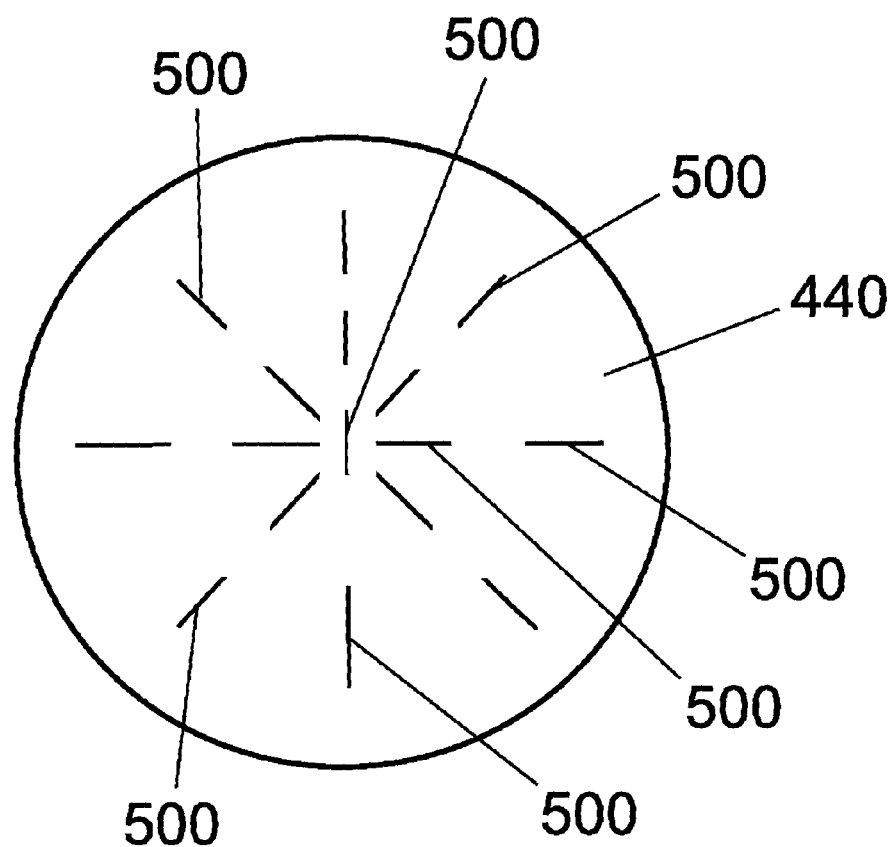
FIG. 5 is a top view of a perforated base, in accordance with an embodiment of the invention.

FIG. 5 is a top view of the perforated base 440, in accordance with an embodiment of the invention. The base 440 has openings (perforations) 500 that permit the juice 435 (FIG. 4) to fall underneath the base 440 and into the juice chamber 456. Those skilled in the art will realize based on the teachings of the embodiments of the invention herein that the openings 500 can be configured or positioned in other arrangements, and that the size, shape, number, and positions of particular individual openings 500 may be varied.

Figure 6:
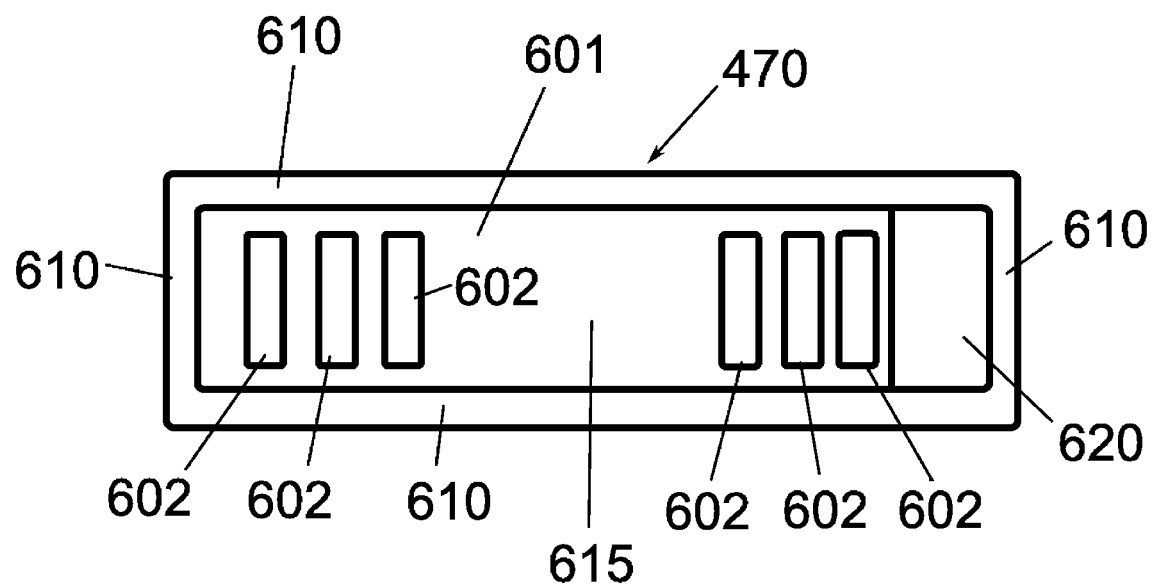
FIG. 6 is a top view of a seed guard, in accordance with an embodiment of the invention.

FIG. 6 is a top view of a seed guard 470, in accordance with an embodiment of the invention. The seed guard 470 prevents a seed of a fruit from falling into the inner opening 436 (FIG. 4) as the seed is dropped from the cutting chamber 405a. Since the seed guard 470 prevents seeds from falling into the inner opening 436, the seeds will not jam or otherwise hinder the operation of the press 450 (FIG. 4). The seed guard 470 permits the seed 471 (FIG. 4) (or peeled fruit skin) to fall into the inner opening 472 (FIG. 4) from the cutting chamber 405a. The seeds that are blocked by the seed guard 470 are then guided into the waste chamber 473 via the waste conduit 472 (FIG. 4).

In an embodiment of the invention, the seed guard 470 includes a seed guard opening 601 for receiving the seeds and perforations 602 for passing the received sliced portions 415 (FIG. 4) from the cutting chamber 405a (FIG. 4) and into the inner opening 436 (FIG. 4) of the squeezing chamber 430a. The perforations 602 are sufficiently smaller in size so that the seeds will not fall through the perforations 602 and sufficiently larger in size so that the sliced portions will fall through the perforations 602.

In an embodiment of the invention, the seed guard 470 includes edge guards 610 at all edges of the seed guard 470, as shown in the example of FIG. 6. In an embodiment of the invention, the seed guard 470 includes a central solid portion 615 so that the seeds and the sliced portions do not fall on top of the press 450 (FIG. 4). The seeds will then fall into the opening 620 which is, in turn, coupled to the waste conduit 472 (FIG. 4) of the squeezing chamber 430a. As a result, the seed guard 470 will cause the seeds to fall along the waste conduit 472 and into the waste chamber 473.

Figure 7:
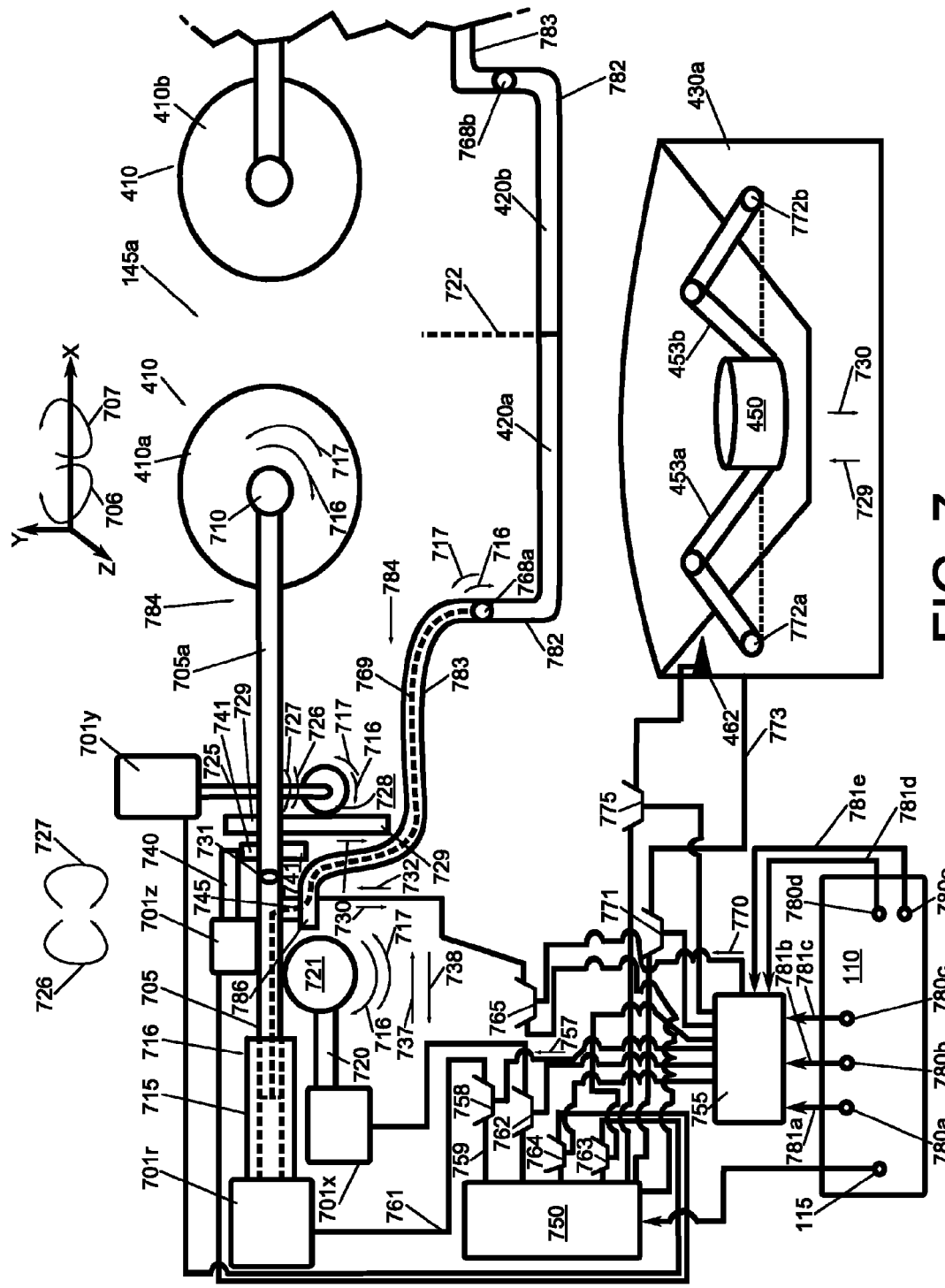
FIG. 7 is a block diagram of a motor assembly, gear assembly, and circuit stage, in accordance with an embodiment of the invention.

FIG. 7 is a block diagram that shows additional details of the motor assembly 485, gear assembly 490, and circuit stage 480 (FIG. 4), in accordance with an embodiment of the invention. In an embodiment of the invention, the motor assembly 485 (FIG. 4) includes one or more motors, depending on the functionality that is desired for the juicer 400. In the example of FIG. 7, the motor assembly 485 includes the motors $701r$, $701x$, $701y$, and $701z$, as will be discussed below. The motors can be, for example and without limitations, standard servo motors or other suitable motors. The motors can be powered by an AC supply source, by batteries, or by portable power supplies. Suitable motors are commercially available from, for example, AllMotion Company of Union City, Calif., Arc Systems, Inc. of Hauppauge, N.Y., or Allied Electronics, Inc., Forth Worth, Tex., as well as other vendors.

The shafts and gears in the shaft and gear assembly 490 (FIG. 4) are also discussed below. As known to those skilled in the art, a gear assembly will convert a motor's rotary motion into a desired reciprocating action. Suitable shafts, gears, and gear assemblies are commercially available from, for example, Rush Gears, Inc. of Fort Washington, Pa., as well as other vendors. The details of shafts and gears that are used for moving an element (e.g., cutters, chambers, or other mechanisms or components) in the x-axis, y-axis, z-axis, rotational, angular, or other directions are well known to those skilled in the art and are also implemented in commercially-available products and, therefore, these details are not discussed herein for purposes of focusing on the particular features of embodiments of the invention.

The motor $701r$ will rotate a shaft 705 in the clockwise direction 706 with respect to the reference horizontal axis x and also rotate the shaft 705 in the counter-clockwise direction 707 with respect to the axis x. The shaft 705 is coupled to a gear 710 which is, in turn, coupled to the cutter 410a. In FIG. 4, the axis x, axis y, and axis z are perpendicular to each other and are non-parallel to each other.

The shaft 705 is also slidable in and out of the outer shaft 715 which also rotates the shaft 705 with respect to the horizontal axis x. Therefore the inner shaft 705 and outer shaft 715 form a standard slidable shaft 716 that can extend in the horizontal direction 737 (parallel to axis x) and that can contract (shrink) in the horizontal direction 738 which is opposite to the horizontal direction 717.

The details of mechanisms that permit a motor to rotate a shaft are known to those skilled in the art. When the shaft 705 rotates in the clockwise direction 706 with respect to the horizontal axis x, the shaft 705 will rotate the gear 710 in the counter-clockwise direction 717 with respect to the reference axis z (which is pointing in a direction away from the page that illustrates FIG. 7). When the shaft 705 rotates in the counter-clockwise direction 707 with respect to the horizontal axis x, the shaft 705 will rotate the gear 710 in the clockwise direction 716 with respect to the reference axis z. It is understood that a gear discussed herein can rotate in an opposite direction that was discussed herein, when a shaft is rotating in a particular direction. Therefore, the rotational directions described herein are provided as possible examples of rotations of gears and shafts. The gear 710 is coupled to the cutter 410. As a result, the cutter 410a will also rotate as the gear 710 rotates. The cutter 410a and gear 710 also rotate in the same direction. Therefore, the motor 701r provides the cutting rotation of the cutter 410a so that the cutter 410 can cut a fruit or vegetable (which can be securely held in the cutting chamber 405a) into portions.

The motor 701x will rotate a shaft 720 in the clockwise direction 706 with respect to the reference horizontal axis x and also rotate the shaft 720 in the counter-clockwise direction 707 with respect to the axis x. When the shaft 720 rotates in the clockwise direction 706 with respect to the horizontal axis x, the shaft 720 will rotate the gear 721 in the clockwise direction 716 with respect to the reference axis z. When the shaft 720 rotates in the counter-clockwise direction 707 with respect to the horizontal axis x, the shaft 720 will rotate the gear 721 in the counter-clockwise direction 717 with respect to the reference axis z. When the gear 721 rotates in the clockwise direction 716, the gear 721 will slide the shaft 705 in the direction 737. As a result, the cutter 410a will move in the direction 737 (parallel to axis x), so that a fruit (not shown in FIG. 7) in the cutting chamber 405a is sliced in the axis x direction. As an example and without limitations, the gear 721 and shaft 705 may be threaded, so that the gear 721 can horizontally move the shaft 705. When the gear 720 rotates in the counter-clockwise direction 707 with respect to axis x, the gear 721 will rotate in the counter-clockwise direction 717 and slide the shaft 705 in the direction 738. As a result, the cutter 410a will move in the direction 738 (parallel to axis x) away from center 722 of the cutting chamber 405a.

The motor 701y will rotate a shaft 725 in the counter-clockwise direction 726 with respect to the reference vertical axis y and also rotate the shaft 725 in the clockwise direction 727 with respect to the axis y. When the shaft 725 rotates in the counter-clockwise direction 726 with respect to the axis y, the shaft 725 will rotate the gear 728 in the clockwise direction 716 with respect to the axis z. When the shaft 725 rotates in the counter-clockwise direction 726 with respect to the axis y, the shaft 725 will rotate the gear 728 in the counter-clockwise direction 717 with respect to the reference axis z. When the gear 728 rotates in the counter-clockwise direction 717, the gear 728 will slide the gear 729 in the downward direction 730 which is parallel to the vertical axis y. As a result, since the gear 729 is coupled to the shaft portion 705a, the gear 729 will move the shaft portion 705a in the downward direction 730. The shaft portion 705a is coupled to the cutter 410a. As a result, the cutter 410a will move in the downward direction 730 to slice the lower portion of a fruit (not shown in FIG. 7) that is secured in the cutting chamber 405a. The shaft portion 705a can pivot along the axis z direction and along the axis y direction from joint member 731.

When the shaft 725 rotates in the clockwise direction 727 with respect to the axis y, the shaft 725 will rotate the gear 728 in the clockwise direction 716 with respect to the reference axis z. When the gear 728 rotates in the clockwise direction 716, the gear 728 will slide the gear 729 in the upward direction 732 which is parallel to the vertical axis y. Since the gear 729 is coupled to the shaft portion 705a, the gear 729 will move the shaft portion 705a in the upward direction 732. As a result, the cutter 410a will move in the upward direction 732 to slice the upper portion of a fruit (not shown in FIG. 7) that is secured in the cutting chamber 405a.

The motor 701z will rotate a shaft 740 in the clockwise direction 706 with respect to the horizontal axis x and also rotate the shaft 740 in the counter-clockwise direction 707 with respect to the axis x. When the shaft 740 rotates in the clockwise direction 706 with respect to the axis x, the shaft 740 will slide the gear 741 in a direction along axis z away the page that shows FIG. 7. As a result, the shaft portion 705a will also move in the same direction as the gear 741 along the axis z. Therefore, the cutter 410a will move in the same direction along the z axis as the gear 741 and a fruit (not shown in FIG. 7) that is secured in the cutting chamber 405a will be sliced from one side to another side along the axis z. The shaft portion 705a can pivot in the axis z direction and along the axis y direction from joint member 731. This functionality is described in additional details in FIG. 8 below.

When the shaft 740 rotates in the counter-clockwise direction 707 with respect to the axis x, the shaft 740 will slide the gear 741 in a direction along the z axis toward the page the shows FIG. 7. Therefore, the cutter 410a will move in the same direction along the z axis as the gear 741. A fruit (not shown in FIG. 7) that is secured in the cutting chamber 405a will be sliced by the cutter 410a from one side to another side.

When the shaft 705 and shaft portion 705a rotate in the clockwise direction 706 with respect to the horizontal axis x, the shaft 705 will rotate the gear 745 in the clockwise direction 727 with respect to the vertical axis y. The gear 745 is coupled to the cutting chamber 405a. When the gear 745 rotates in the clockwise direction 727 with respect to the axis y, the gear 745 will rotate the cutting chamber 405a in the counter-clockwise direction 726 with respect to the axis y. As a result, a fruit (not shown in FIG. 7) that securely held in the chamber 405a, will also rotate in the counter-clockwise direction 726, and the rotating cutter 410a will cut the circumference of the rotating fruit.

When the shaft 705 and shaft portion 705a rotate in the counter-clockwise direction 707 with respect to the horizontal axis x, the shaft 705 will rotate the gear 745 in the counter-clockwise direction 726 with respect to the vertical axis y. When the gear 745 rotates in the counter-clockwise direction 726 with respect to the axis y, the gear 745 will rotate the cutting chamber 405a in the clockwise direction 727 with respect to the axis y. As a result, a fruit (not shown in FIG. 7) that is securely held in the chamber 405a, will also rotate in the clockwise direction 727, and the rotating cutter 410a will cut the circumference of the rotating fruit.

In FIG. 7, only a partial view of the cutting chamber 405a is shown for purposes of avoiding in overcrowding the drawings. In an embodiment of the invention, the cutting chamber 405a includes the sidewall 782 which surrounds at least a portion of the fruit 150 that is removably inserted into the cutting chamber 405a. The sidewall 782 is parallel, substantially parallel, or oriented in or nearly in the direction of the Y axis as similarly shown in FIG. 7. The cutting chamber 405*a* includes a sidewall 783 that has a sidewall portion 786 that is in contact with the gear 745. The sidewall 783 is in contact with sidewall 782 as shown in FIG. 7 and is curved in the downward Y-axis direction so that an open space 784 is formed adjacent the sidewall 783 to allow the cutter 405*a* to move in the downward Y-axis direction without obstruction to the cutter 405*a* movements.

Only a partial view of the sidewall 783 is shown near the cutter 410*b* for purposes of avoiding in overcrowding the drawings. The sidewall 783 will also allow the open space 784 on the top portion of the cutting chamber 405*a*. This open space 784 allows the cutter 405*a* to move in the X-axis direction, Y-axis direction, and Z-axis direction without obstruction to the cutter 405*a* movements.

An embodiment of the invention can also instead use a single motor that can control movements of members along the x axis, y axis, and z axis, and rotational movements, as motor technology advances, or if technology constraints, costs constraints, or/and manufacturing constraints permit the use of a single motor that can permit the above movements.

A power source 750 provides power that is needed by at least some of the components in FIG. 7. The power source 750 can be, for example and without limitations, the AC power source 135 or portable power supply 140 in FIG. 1.

The various electrical and electronic components in FIG. 7 (e.g., switches/actuators relays, wires and conductors, timing logic circuit 755, and user interface 110) are commercially available from, for example, various electrical/electronic vendors such as Allied Electronics.

The user can turn the juicer 400 (FIG. 4) in an "ON" state and "OFF" state by use of the actuator (e.g., switch) 115 in the user interface 110. When the user turns the juicer "ON", the power source 750 will connect to the juicer 400.

The timing logic circuit 755 controls various relays components. For example, when the juicer 400 is turned "ON" via the "ON" setting in the actuator 115, the control signal 756 from the timing logic circuit 755 will result in the relay 758 to electrically couple the motor 701*r* to the power source 750, via electrical paths 759 and 761. The power from the power source 750 will turn on the motor 701*r* which, in turn, will rotate the extendable shaft 716, outer shaft 715, slidable shaft 705, and shaft portion 705*a*. As discussed above, the rotation of the shaft portion 705*a* will rotate the cutter 410.

When the user turns the actuator 115 in the "OFF" setting, the control signal 756 will have a logic zero value (i.e., the control signal 756 is no longer transmitting). As a result, the relay 758 will be an open circuit that forms a disconnection between the electrical paths 759 and 761. Therefore, the power source 750 will not be able to supply power to the motor 701*r* and the motor 701*r* will off. Since the motor 701*r* is off, the cutter 410*a* will not be rotating when the user turns the actuator 115 in the "OFF" setting".

Control signals from the timing logic circuit 755 will also control other relays in a similar manner as discussed above. The relay 762 connects the power source 750 to the motor 701*x* that permits movement of the cutter 410*a* along the axis x. The relay 763 connects the power source 750 to the motor 701*y* that permits movement of the cutter 410*a* along the axis y. The relay 764 connects the power source 750 to the motor 701*z* that permits movement of the cutter 410*a* along the axis z.

The relay 765 connects the power source 750 to the arm actuators 768*a* and 768*b*, for controlling the movements of the bottom portions 420*a* and 420*b*, respectively. An electrical path 769 (via cutting chamber 405*a* body and extendable shaft 716) will transmit power from the power source 750 to the actuators 768*a* and 768*b*. In response to the transmitted power, the actuator 768*a* will rotate in the clockwise direction 716 so that the actuator 768*a* will cause the bottom portion 420*a* to rotate in the clockwise direction 716, as has been discussed in FIG. 4 so that an opening is formed at the bottom of the cutting chamber 405*a*. In response to the transmitted power, the actuator 768*b* will rotate in the counter-clockwise direction 717 so that the actuator 768*b* will cause the bottom portion 420*b* to rotate in the counter-clockwise direction 717, as has been discussed in FIG. 4 so that the opening is formed at the bottom of the cutting chamber 405*a*.

In response to no transmitted power, the actuator 768*a* will rotate in the counter-clockwise direction 717 so that the actuator 768*a* will cause the bottom portion 420*a* to rotate in the counter-clockwise direction 717, as has been discussed in FIG. 4 so that the opening is closed at the bottom of the cutting chamber 405*a*. In response to no transmitted power, the actuator 768*b* will rotate in the clockwise direction 716 so that the actuator 768*b* will cause the bottom portion 420*b* to rotate in the clockwise direction 716, as has been discussed in FIG. 4 so that the opening is closed at the bottom of the cutting chamber 405*a*. The control signal 770 will turn on the relay 765 so that the relay 765 connects the power source 750 to the actuators 768*a* and 768*b*. When the control signal 770 is at a zero logic value (i.e., the control signal 770 is not transmitting from the timing logic circuit 755), the relay 765 forms an open circuit between the power source 750 and the actuators 76*a*/768*b*. Due to this open circuit, the power source 750 is not able to transmit power to the actuators 768*a*/768*b*.

Suitable actuators are commercially available from, for example, Parker Hannifin Corporation, Cleveland, Ohio or other vendors. Suitable arm products are commercially available from, for example, Kimseed Engineering, Australia or other vendors.

The relay 771 connects the power source 750 to the arm actuators 772*a* and 772*b*, for controlling the movements of the arms 453*a* and 453*b*, respectively. An electrical path 773 (via housing 105 body and squeezing chamber 430*a* body) will transmit power from the power source 750 to the actuators 772*a* and 772*b*. In response to the transmitted power, the actuator 772*a* will rotate in the clockwise direction 716 so that the actuator 772*a* will cause the press 450 to move downward 730, as has been discussed in FIG. 4 so that the sliced fruit portions are crushed by the press. In response to the transmitted power, the actuator 772*b* will rotate in the counter-clockwise direction 717 so that the actuator 772*b* will cause the press 450 to move downward 730.

In response to no transmitted power, the actuator 772*a* will rotate in the counter-clockwise direction 717 so that the actuator 772*a* will cause the press 450 to move upward 729, as has been discussed in FIG. 4. In response to no transmitted power, the actuator 772*b* will rotate in the clockwise direction 716 so that the actuator 772*b* will cause the press 450 to move upward 729.

The relay 775 connects the power source 750 to the liquid spray 462. In response to power, the spray 462 will spray the liquid 465 into the squeezing chamber 430*a*, as has been discussed in FIG. 4. In response to no power, the spray 462 is not spraying the liquid 465 into the squeezing chamber 430*a*.

In an embodiment of the invention, the timing logic circuit 755 sends out control signals (e.g., control signals 757 and 770 and other control signals to the other relays in FIG. 7) at time values so that, for example, the cutter 410*a* will rotate while the juicer 400 is on, and the cutter 410 will slide along axis x, along axis y, and along axis z while cutting the fruit (not shown in FIG. 7) that is securely held in the cutting chamber 405a. Subsequently, the control signals will cause to stop the rotation of the cutter 410, will cause to swing open the bottom portions 420a/420, and will cause the press 450 to crush the sliced fruit portions. Therefore, the timing logic circuit 755 generates control signals at values and sequences that control the relays in FIG. 7, so that the above-discussed operations are performed by the juicer 400.

In an embodiment of the invention, the selectors 780a, 780b, and 780c allow the user to select a fruit size setting of small, medium, and large, respectively. The user interface 110 will send input signals 781a, 781b, and 781c to the timing logic circuit 755, depending on the selector that is selected by the user. For example, by pressing the selector 780a, the sequence of operation discussed above for the cutter 410a will be a shorter time interval, as controlled by the control signals from the timing logic circuit 755, because the fruit being sliced in the cutting chamber 405a is smaller in size. By pressing the selector 780c, the sequence of operation discussed above for the cutter 410a will be a longer time interval because the fruit being sliced in the cutting chamber 405a is larger in size.

Therefore, the estimated time frame that one fruit 150 will be processed (sliced and then crushed for juicing) will depend on the selected mode among selectors 780a, 780b, and 780c. As an example and without limitations, selecting the selector 780a for a small-sized fruit 150 may result in a total processing time of about 20 seconds, although other time values are possible.

The selected mode among selectors 780a, 780b, and 780c will also determine the amount of fruit flesh that is removed from the fruit during the slicing of the fruit. For example, selecting the selector 780a for a small-sized fruit 150 may result in about 90% of the fruit flesh to be sliced away from the fruit 150, although other percentage values are possible depending on the time amount that a cutter 410 will rotate.

In an embodiment of the invention, the juicer 400 allows a juicing-only mode where a fruit 150 will not be sliced in the cutting chamber 405a, and will instead be juiced and crushed in the juicing chamber 430a. To set the juicing-only mode, the user will select the selector 780d which causes the user interface block 110 to generate the control signal 781d to the timing logic circuit 755. In response to the control signal 781d, the timing logic circuit 755 will send control signals to the actuators 768a/768b to immediately open the movable bottom portions 420/420b apart from each other and cause the seed guard 470 to flip upward via actuation of seed guard actuator 491 (FIG. 4) which can be controlled from a control signal from the timing logic circuit 755. As a result, the user can place a fruit 150 (e.g., a pear) into the cutting chamber 405a, and the fruit 150 will then fall straight into the juicing chamber 430a. The control signals from the timing logic circuit 755 will not activate the cutters 410a/410b in the juicing-only mode, and will instead cause the actuators 772a/772b to move the press 450 to crush and juice the whole un-sliced fruit 150 in the juicing chamber 430a.

In an embodiment of the invention, the juicer 400 allows a peeling-only mode where a fruit 150 will not be sliced in the cutting chamber 405a, and instead, the skin of the fruit 150 is peeled and most of the fruit 150 will then be juiced and crushed in the juicing chamber 430a. To set the peeling-only mode, the user will select the selector 780e which causes the user interface block 110 to generate the control signal 781e to the timing logic circuit 755. In response to the control signal 781e, the timing logic circuit 755 will send control signals to the motors, as similarly discussed above, so that the cutters 410a/410b will sliced the fruit 150 at a minimal timeframe (for example and without limitations, about 5 seconds), so that the skin is sliced from the fruit 150 and the cutting of any additional flesh from the fruit 150 is minimized. The control signal from the timing logic circuit 755 will then open apart the bottom portions 420a/420b and flip upward the seed guard 470 as similarly discussed above. The skin-less fruit then falls into the juicing chamber 430a and is then crushed and juiced by the press 450 as similarly discussed above.

In an embodiment of the invention, some or all of the motors 701r, 701x, 701y, and 701z are configured to rotate in one direction (e.g., clockwise) and then subsequently rotate in an opposite direction (counter-clockwise) after a given time interval, so that the cutter 410a can slide along the axis x, along axis y, and along axis z, and also rotate clockwise 716 and counter-clockwise 717. Based on the discussion of the embodiments of the invention as presented herein, those skilled in the art will realize that the positions and/or configurations of the components in FIG. 7 can be varied for different sizes and/or different shapes of the juicer housing 105 (FIG. 1) and/or can be varied for different configurations and/or different sizes of the circuitry of the juicer 400 (FIG. 4). Therefore, any of the motors 701x, 701y, 701z, and/or 701r (and/or other juicer 400 components) can be placed in other positions that differ from the configuration as shown in FIG. 7. The components in FIG. 7 are illustrated in non-limiting example positions for purposes of explaining the functionalities of the embodiments of the invention, and these components in FIG. 7 can be configured into other example positions.

Figure 8:
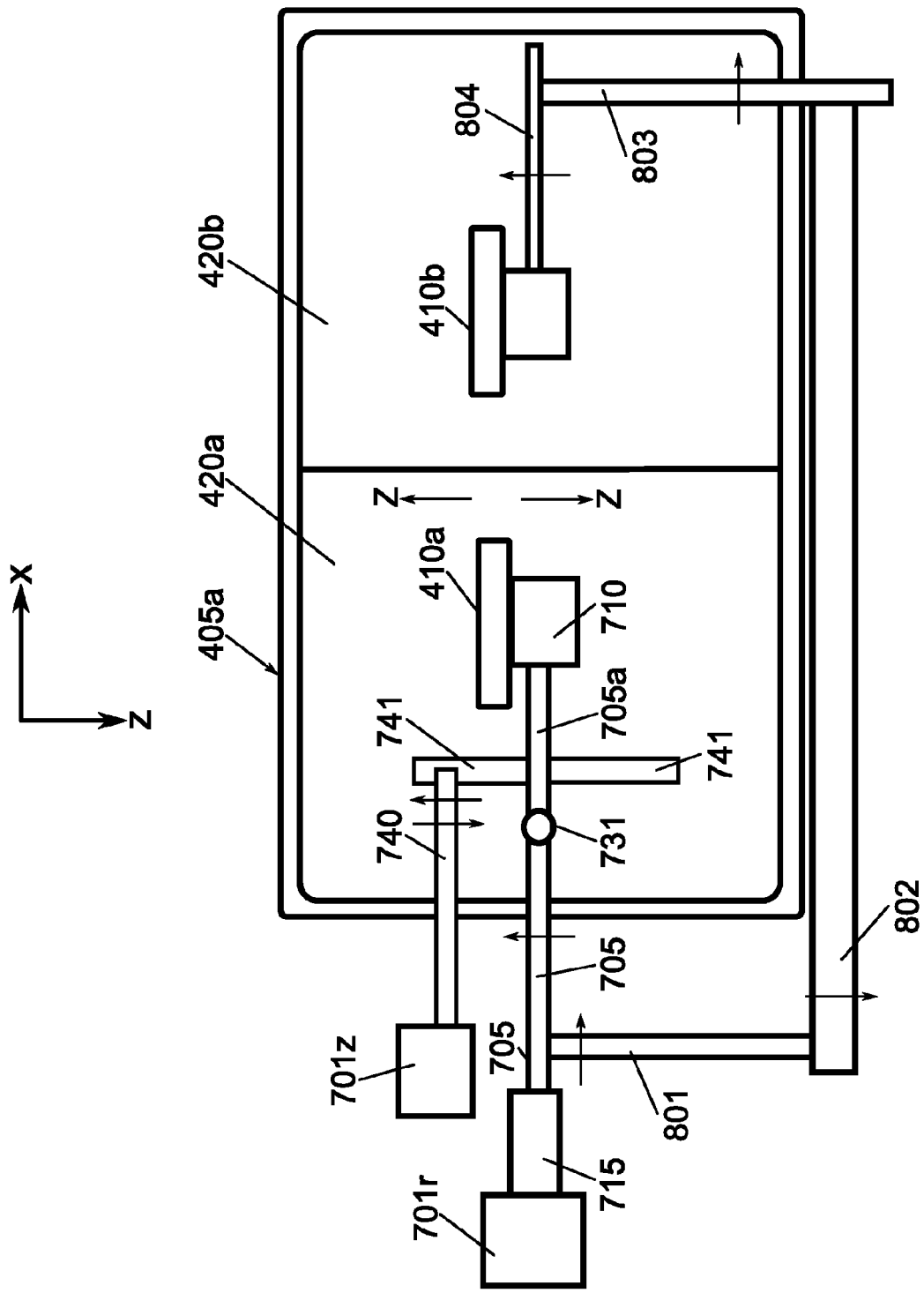
FIG. 8 is a partial top view of a cutting chamber, in accordance with an embodiment of the invention.

FIG. 8 is a partial top view of the cutting chamber 405a, in accordance with an embodiment of the invention. As similarly discussed above, the gear 741 can slide along the axis z based on the rotation of the shaft 740. As a result, the cutter 410a can slide along the axis z in a side-to-side manner.

In an embodiment of the invention, the cutter 410a can be coupled to the cutter 410b (and to other cutters in the cutting chamber 405a if more than two cutters 410 are included in the cutting chamber 405a). The rotation members 801, 802, and 803 permit the shaft 705 of the cutter 410a to also rotate the shaft 804 of the cutter 410b. The rotation members 801, 802, and 803 can be shafts or gears, depending on the size of the rotation members. Of course, other suitable mechanism can be used instead of the rotation members 801, 802, and 803, in order to rotate the cutter 410b as the cutter 410a is rotating.

The rotation members 801, 802, and 803 also allow the cutter 410b to move along the axis x, axis y, or/and axis z, as the cutter 410a is also moving along the axis x, axis y, or/and axis z, respectively.

In FIG. 8, the cutting chamber 405a is shown as non-circular in shape. However, in a non-limiting example, the cutting chamber 405a is circular in shape or substantially circular in shape.

Figure 9:
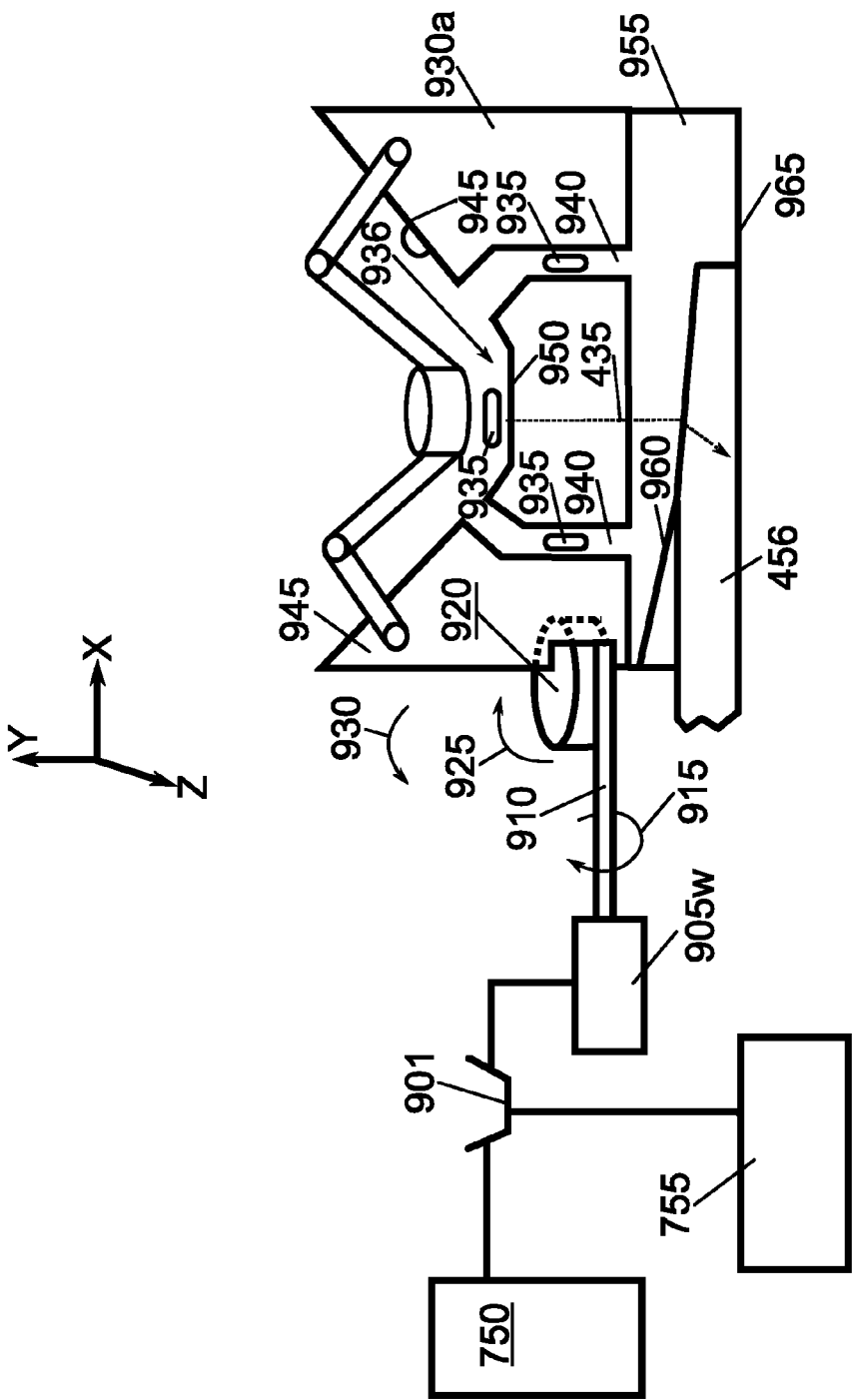
FIG. 9 is a block diagram of a squeezing chamber, in accordance with another embodiment of the invention.

FIG. 9 is a block diagram of a squeezing chamber 930a, in accordance with another embodiment of the invention. The relay 901 is controlled by the timing logic circuit 755 and connects the power source 750 to motor 905w. The motor 905w will rotate the shaft 910 in the clockwise direction with respect to the axis x. When the shaft 910 rotates in the clockwise direction 915 with respect to the horizontal axis x, the shaft 910 will rotate the gear 920 in the clockwise direction 925 with respect to the vertical axis y. The gear 920 is coupled to the squeezing chamber 930a. When the gear 920 rotates in the clockwise direction 925 with respect to the axis y, the gear 920 will rotate the squeezing chamber 930a in the counter-clockwise direction 930 with respect to the axis y. As a result of the spinning squeezing chamber 930a, the centripetal force in the inner opening 936 of the squeezing chamber 930a will force the waste 935 (crushed sliced fruit portions) to lift and fall into the waste conduits 940 at the lower parts of the inner wall 945 and adjacent to the perforated base 950 which is at the bottom or base of the squeezing chamber 930a. The waste 935 will then fall into the waste chamber 955 which can then be subsequently emptied by the user. The waste chamber 955 may have an angled portion 960 that is angled with respect to the horizontal axis x, so that the gravitational force will make the waste 935 to fall into the lower portion 965 of the waste chamber. The angled portion 960 is perforated so that the juice 435 can flow from the inner opening 936 and into the juice chamber 456.

Figure 10:
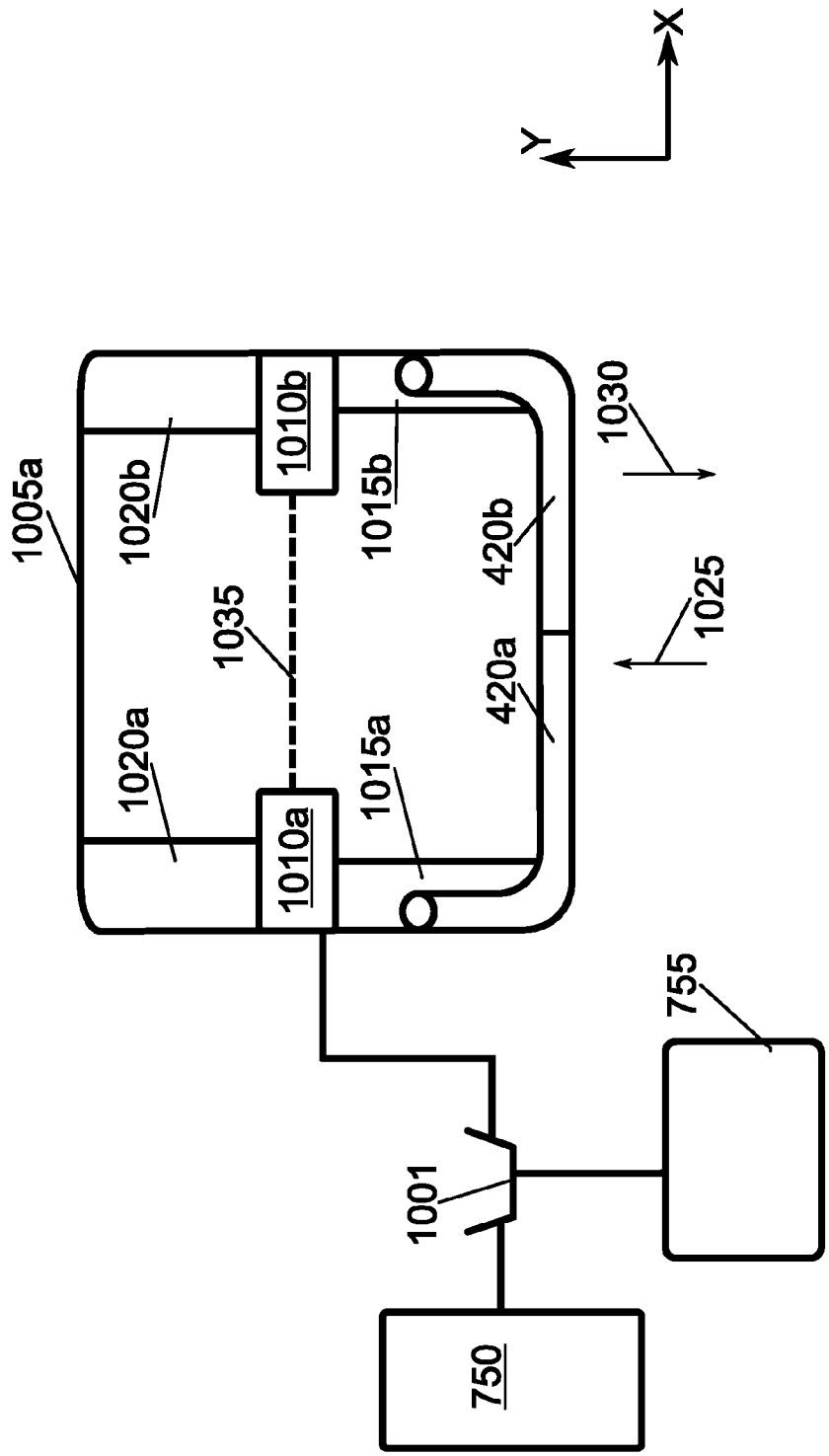
FIG. 10 is a block diagram of a cutting chamber, in accordance with another embodiment of the invention.

FIG. 10 is a block diagram of a cutting chamber 1005a, in accordance with another embodiment of the invention. The relay 1001 is controlled by the timing logic circuit 755 and connects the power source 750 to member pull mechanisms 1010a and 1010b. The pull mechanisms 1010a/1010b can be, for example, hydraulic actuators that can pull a member from one position to another position. Hydraulic actuators are commercially available from, for example, Parker Hannifin Corporation or other vendors.

In response to power transmitted from the power source 750, the pull mechanism 1010a will pull up the lower member 1015a into the upper member 1020a, in direction 1025 (parallel to the axis y) and the pull mechanism 1010b will pull up the lower member 1015b into the upper member 1020b, so that the size of the cutting chamber 1005a is reduced to accommodate slower sized fruits. In response to no power, the pull mechanism 1010a will lower down the lower member 1015a from the upper member 1020a, in direction 1030 (parallel to the axis y) and the pull mechanism 1010b will lower down the lower member 1015b from the upper member 1020b so that the size of the cutting chamber 1005a is no longer reduced. The fruit size selector 780a and/or 780b (FIG. 7) can be configured to transmit the control signals 781a and 781b (FIG. 7) to the timing logic circuit 755 which, in turn, will actuate the relay 1001 to connect the power source 750 to the pull mechanisms 1010a/1010b. An electrical path 1035 in the body of the cutting chamber 1005a can electrically couple the pull mechanisms 1010a and 1010b together.

Figure 11:
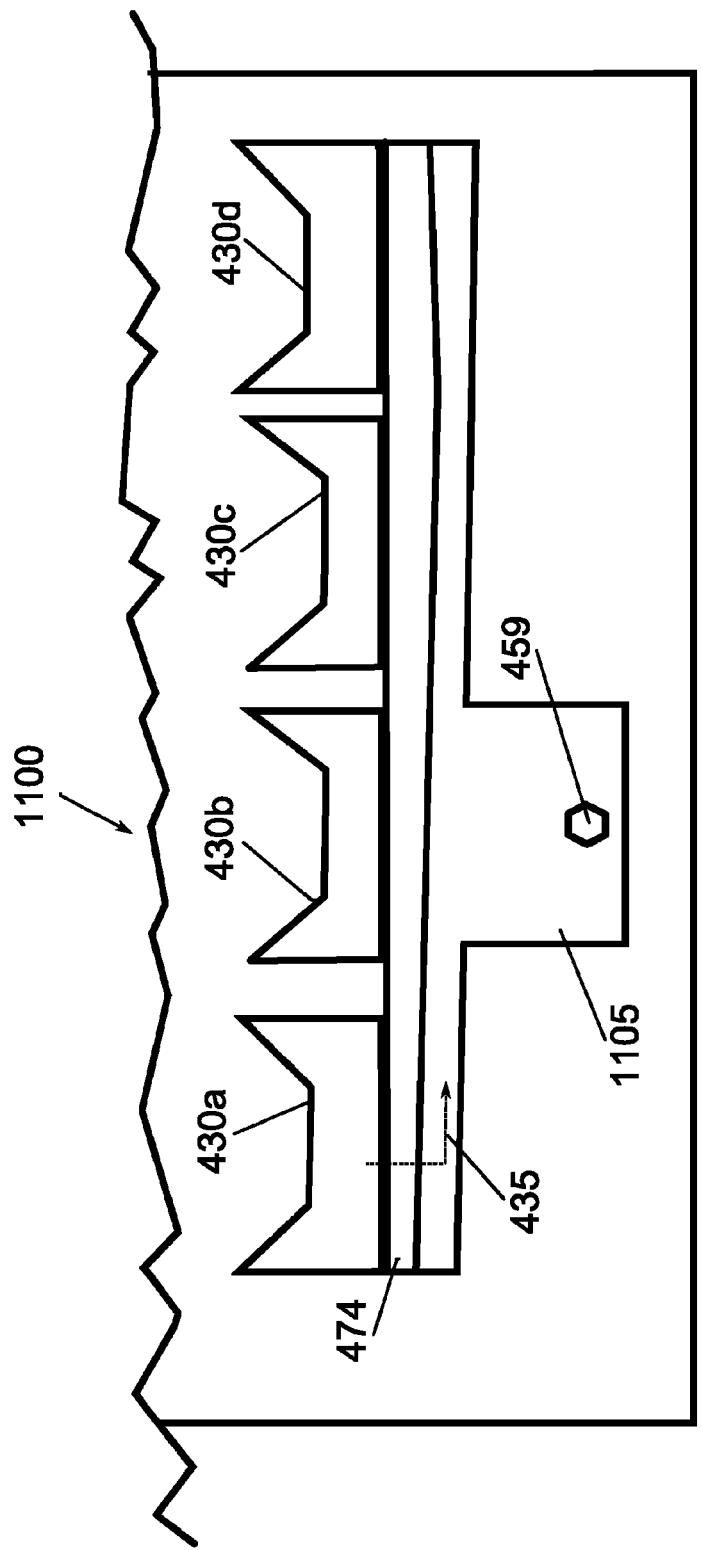
FIG. 11 is a block diagram of a juicer with a single juice collection point, in accordance with another embodiment of the invention

FIG. 11 is a block diagram of a juicer 1100 with a single juice collection point 1105 which can be a juice collection chamber 1105, in accordance with another embodiment of the invention. For purposes of avoiding in overcrowding the drawings, only a portion of the juicer 1100 is shown in FIG. 11 and the other components of a juicer (as, for example, shown in FIG. 4) are omitted. The juice 435 is shown as falling from the juicing chambers 430a, 430b, 430c, and 430d and then into the juice collection chamber 1105.

The user of the juicer 1100 can then obtain the collected juice 435 in the juice collection chamber 1105 by accessing the opening 459. The opening 459 can be, for example and without limitations, a faucet-like mechanism, spout, or another suitable component that permits the user to obtain the collected juice 435 in the juice collection chamber 1105. The opening 459 can be disposed in, for example, a wall of the juice housing 105 (FIG. 1).

Figure 12A:
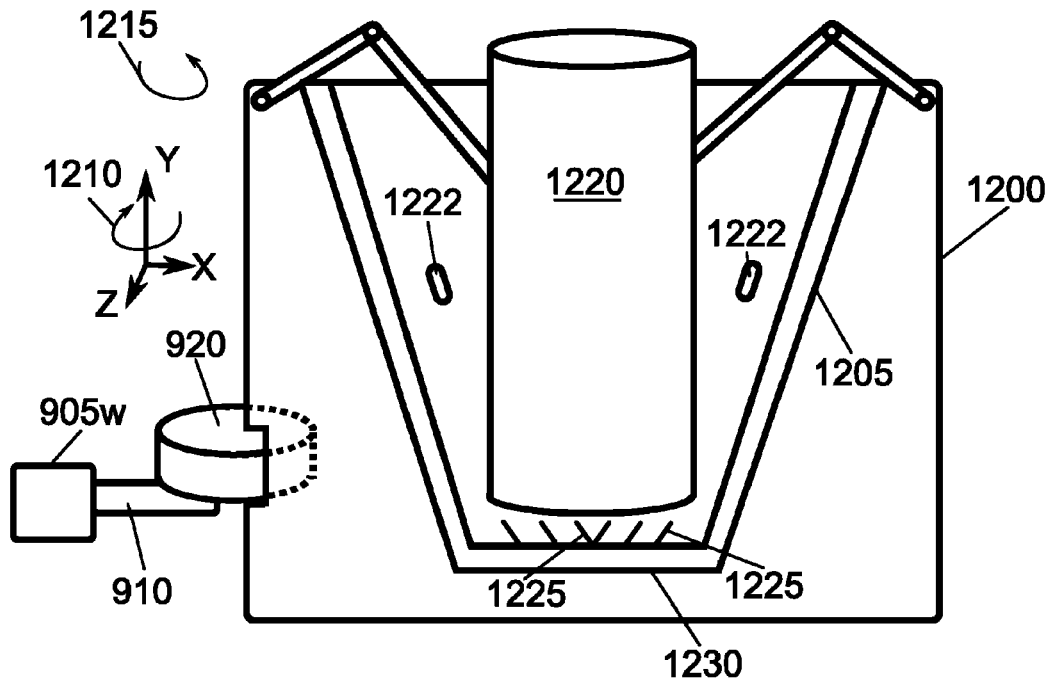
FIGS. 12A and 12B are block diagrams of a squeezing chamber and sieve, in accordance with another embodiment of the invention.
Figure 12B:
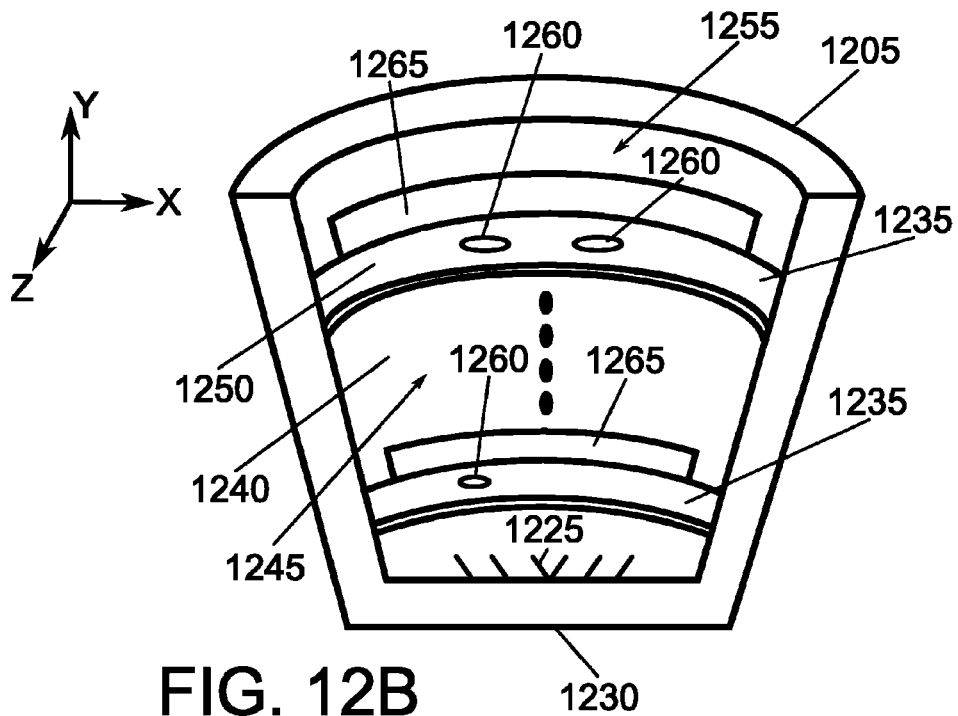

FIGS. 12A and 12B are block diagrams of a squeezing chamber 1200 and sieve 1205, in accordance with another embodiment of the invention. As similarly discussed above with reference to FIG. 9, the motor 905w will rotate the shaft 910 with respect to the axis x. When the shaft 910 rotates with respect to the horizontal x-axis, the shaft 910 will rotate the gear 920 with respect to the vertical y-axis. The gear 920 is coupled to the squeezing chamber 1205 as discussed above. When the gear 920 rotates with respect to the y-axis, the gear 920 will rotate the squeezing chamber 1205 in an opposite rotational direction with respect to the y-axis. For example, the squeezing chamber 1205 can rotate in the clockwise direction 1210 with respect to the vertical y-axis. Alternatively, in another implementation in a juicer product that embodies that squeezing chamber 1200, the sieve 1205 and squeezing chamber 1200 can rotate in the counter-clockwise direction 1215 with respect to the vertical y-axis.

As similarly discussed above, a press 1220 can crush the sliced fruit pieces 1222 (or sliced vegetable pieces 1222) so that the press 1220 can juice the sliced fruit or vegetable pieces. Additionally, in an embodiment of the invention, the sieve 1205 includes the cutters 1225 at the floor 1230 (or bottom portion 1230) of the sieve 1205. The cutters 1225 can further slice and extract juice from the sliced fruit pieces 1222 as the squeezing chamber 1200 is rotating with respect to the y-axis. As similarly discussed above, the floor 1230 includes perforations to permit the juice to flow from the squeezing chamber 1200 to a juice collection chamber 456 (FIG. 4). In an embodiment of the invention, the press 1220 will not come into contact with cutters 1225 and will not damage the press 1220.

Referring now to FIG. 12B, additional details of the sieve 1205 is shown in accordance with an embodiment of the invention. The sieve 1205 includes a plurality of ribs 1235 that are coupled to the inner wall 1240 of the sieve 1205. The ribs 1235 will protrude toward the inner opening 1245 that is surrounded by the inner wall 1240. The top surface 1250 of a rib 1235 will face toward the top opening 1255 of the sieve 1205, where the top opening 1255 is opposite of the floor 1230. Although only two ribs 1235 are shown in FIG. 12B, any number of ribs 1235 (e.g., four ribs) may be included in the sieve 1205.

When the squeezing chamber 1205 is spinning with respect the y-axis, the waste 1260 (which are sliced portions 1222 of FIG. 12A that have been juiced) will settle on the top surfaces 1250 of the ribs 1235. The spinning motion of the sieve 1205 will cause the waste 1260 to fall or enter into the openings 1265 which are adjacent to or above the ribs 1235. The openings 1265 are coupled to the waste chamber 473 (FIG. 4) so that the waste 1260 will travel through the opening 1265 and into the waste chamber 473. The waste 1260 that are collected in the waste chamber 473 can then be subsequently disposed by the user.

The sieve 1205 is disposed within an interior of the squeezing chamber 1200 (FIG. 12A). As an example and without limitations, the sieve 1205 is cone-shaped or substantially cone-shaped. As another example and without limitations, the sieve 1205 is cylindrical-shaped or substantially cylindrical shaped. The sieve 1205 can have other suitable geometric shapes.

In another embodiment of the invention, a method of assembling a juicer includes: providing a cutting chamber; placing at least one cutter in the cutting chamber; providing a squeezing chamber in a position adjacent to the cutting chamber; and providing a press in the squeezing chamber. The various components in the above method have been previously described above.

Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus for a juicer, comprising:
 a housing including a fruit entry;
 a cutting chamber within the housing and coupled to the fruit entry for receiving a fruit or vegetable;
 a squeezing chamber within the housing and adjacent to the cutting chamber;
 wherein the cutting chamber includes a cutter and wherein the cutting chamber rotates with respect to a reference vertical axis;
 wherein the cutter cuts the fruit or vegetable within the cutting chamber into sliced portions;
 wherein the cutting chamber comprises bottom portions that separate from each other in order to permit the sliced portions to fall from the cutting chamber and that move into contact with each other;
 wherein the squeezing chamber is positioned below the cutting chamber;
 wherein the squeezing chamber receives the sliced portions that fall from the cutting chamber;
 wherein the squeezing chamber includes a press for pressing the sliced portions;
 wherein the squeezing chamber includes a seed guard for preventing a seed from falling into the squeezing chamber as the seed is dropped from the cutting chamber; and
 a juice collection chamber coupled to the squeezing chamber, wherein juice falls from the squeezing chamber into the juice collection chamber.

2. The apparatus of claim 1, wherein the cutter is configured to move in at least one of three non-parallel axis.

3. The apparatus of claim 1, further comprising a sieve disposed within an interior of the squeezing chamber, the sieve including a plurality of ribs coupled to an inner wall of the sieve and openings adjacent to the ribs.

4. The apparatus of claim 3, wherein the sieve is substantially cone-shaped.

5. The apparatus of claim 3, wherein the sieve is substantially cylindrical shaped.

6. The apparatus of claim 1, wherein the squeezing chamber comprises an inner opening configured to receive the sliced portions of the fruit or vegetable.

7. The apparatus of claim 1, wherein the squeezing chamber comprises a perforated base.

8. The apparatus of claim 1, further comprising:
 a slidable waste tray adjacent to the squeezing chamber.

9. The apparatus of claim 7, further comprising:
 bottom cutters on the perforated base.

10. The apparatus of claim 1, further comprising:
 a spray configured to spray liquid into the squeezing chamber.

11. The apparatus of claim 1, wherein the squeezing chamber comprises a waste conduit.

12. The apparatus of claim 1, further comprising:
 a motor and a shaft coupled to the motor, wherein the motor and shaft are configured to rotate the cutter.

13. The apparatus of claim 1, wherein the press comprises a durable material.

14. The apparatus of claim 1, further comprising:
 movable arms configured to move the press.

15. The apparatus of claim 1, further comprising:
 a waste conduit coupled to the seed guard and configured to receive the seed.

16. The apparatus of claim 15, further comprising:
 a user interface on the juicer housing.

17. The apparatus of claim 15, further comprising:
 a cover configured to be placed on the housing.

* * * * *